United States Patent
Heiling et al.

(10) Patent No.: US 8,762,611 B2
(45) Date of Patent: Jun. 24, 2014

(54) SYSTEM COMPRISING A BUS, AND METHOD TO TRANSMIT DATA OVER A BUS SYSTEM

(75) Inventors: Christian Heiling, Graz (AT); Heimo Hartlieb, Graz (AT)

(73) Assignee: Infineon Technologies AG, Neubiberg (DE)

( * ) Notice: Subject to any disclaimer, the term of this patent is extended or adjusted under 35 U.S.C. 154(b) by 274 days.

(21) Appl. No.: 13/397,229

(22) Filed: Feb. 15, 2012

(65) Prior Publication Data

US 2013/0212312 A1    Aug. 15, 2013

(51) Int. Cl.
*G06F 13/00* (2006.01)

(52) U.S. Cl.
USPC .......................... 710/106; 713/401; 365/194

(58) Field of Classification Search
CPC ............ G06F 13/1689; G06F 13/4265; G06F 13/4278; G06F 13/4282

USPC ................... 710/100, 106; 713/401; 365/194; 326/21, 93

See application file for complete search history.

(56) References Cited

U.S. PATENT DOCUMENTS

| | | | | |
|---|---|---|---|---|
| 5,708,381 | A  * | 1/1998  | Higashisaka | 327/276 |
| 5,920,216 | A  * | 7/1999  | Fischer | 327/158 |
| 6,198,326 | B1 * | 3/2001  | Choi et al. | 327/263 |
| 8,188,765 | B2 * | 5/2012  | Ouellette et al. | 326/93 |
| 8,222,920 | B2 * | 7/2012  | Barbier | 326/38 |
| 8,549,342 | B1 * | 10/2013 | Moss et al. | 713/500 |
| 2005/0122151 | A1 * | 6/2005  | Feng et al. | 327/277 |
| 2007/0046335 | A1 * | 3/2007  | Becker et al. | 326/93 |
| 2007/0277071 | A1 * | 11/2007 | Chong et al. | 714/744 |
| 2010/0008456 | A1 * | 1/2010  | Rohatschek | 375/354 |
| 2010/0083027 | A1 * | 4/2010  | Oh | 713/601 |

* cited by examiner

*Primary Examiner* — Glenn A Auve
(74) *Attorney, Agent, or Firm* — Slater & Matsil, L.L.P.

(57) ABSTRACT

A system including a bus, and a method to transmit data over a bus system are disclosed. According to an embodiment, a method to transmit data over a bus system includes deliberately delaying the transmission of data. The deliberate delay caused by deliberately delaying the transmission of data may be chosen to predominate stochastic delay differences.

31 Claims, 4 Drawing Sheets

SYSTEM COMPRISING A BUS, AND METHOD TO TRANSMIT DATA OVER A BUS SYSTEM

TECHNICAL FIELD

The invention generally relates to an electrical or electronic system and, in more specific embodiments, to a system comprising a bus and a method to transmit data over a bus system.

BACKGROUND

In electrical or electronic systems, various individual system modules, for instance various electronic/electric assemblies, various electronic/electric components, for instance various semi-conductor components such as integrated circuits, etc., various sub-components, provided in one and the same component or integrated circuit etc., communicate via a transfer medium such as a bus system.

A bus system may comprise one or more transfer lines. Bus systems can be used jointly by several, in particular by two or more than two modules/components/elements of a respective system.

Many conventional bus systems comprise several partial systems, for example, a data bus consisting of one or more data lines, and/or an address bus consisting of one or more address lines, and/or a control bus consisting of one or more control lines, etc.

In comparison to this, other bus systems are of a much simpler construction. For example, a so-called IBCB bus (IBCB=Inter Block Communication Bus) in general merely comprises two transmission lines to connect two respective modules/components/elements.

Further examples for relatively simple bus systems are CAN busses (CAN=Controller Area Network), which generally only comprise two or three lines (e.g., CAN_HIGH, CAN_LOW, and optionally, CAN_GND (ground)), LIN busses (LIN=Local Interconnect Network), which generally comprise only one single transmission line, etc.

In conventional systems, in many cases, various modules/components/elements are connected in a chain-like structure over various busses. For instance, a first component is connected via a first bus to a second component, the second component is connected via a second bus to a third component, the third component is connected via a third bus to a fourth component, etc. Hence, e.g., a logical "1" (or correspondingly, a logical "0") may first be transmitted from the first component via the first bus to the second component, then from the second component via the second bus to the third component, then from the third component via the third bus to the fourth component, etc.

However, there are components where the delay caused by a respective component in such a chain structure may differ depending on whether, e.g., a logical "1", or a logical "0" is transmitted, and/or whether there is, e.g., a positive, or a negative level shift, etc. Such delay differences, e.g., may vary depending on the temperature, the supply voltage, inherent differences between individual components, etc., and hence are not predictable.

If a relatively high number of components are connected in a chain structure, such delay differences may sum up such that the maximum total possible delay difference gets close to the length of an individual symbol (e.g., the length of a transmitted logical "1", and/or the length of a transmitted logical "0"). This limits the minimum possible length of a symbol, and hence, the maximum possible data rate.

For these or other reasons there is a need for improved systems comprising a bus, and improved methods to transmit data over a bus system.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Other embodiments of the present invention and many of the intended advantages of the present invention will be readily appreciated, as they become better understood by reference to the following detailed description.

DETAILED DESCRIPTION OF ILLUSTRATIVE EMBODIMENTS

In the following detailed description, reference is made to the accompanying drawings, which form a part hereof, and in which is shown by way of illustration specific embodiments in which the invention may be practiced. It is to be understood that other embodiments may be utilized and structural or other changes may be made without departing from the scope of the present invention. The following detailed description, therefore, is not to be taken in a limiting sense, and the scope of the present invention is defined by the appended claims.

Figure 1:
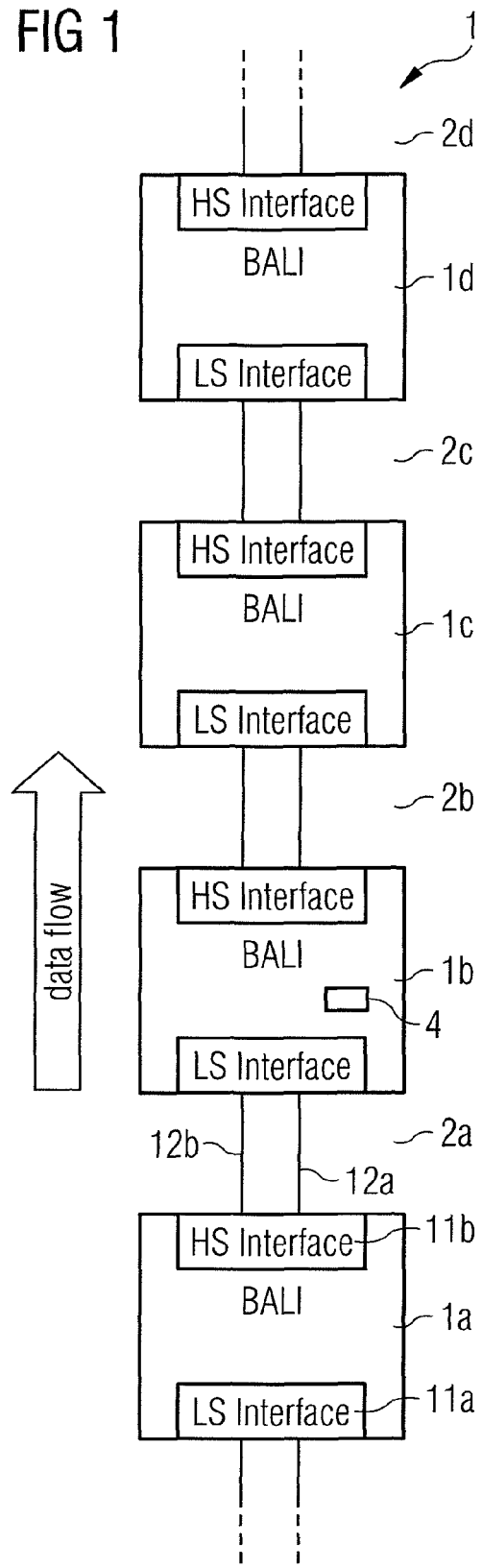
FIG. 1 depicts a schematic structure of an exemplifying electronic/electric system comprising a bus in which a method to transmit data according to an embodiment of the invention may be employed.

FIG. 1 shows a schematic representation of an exemplifying electronic/electric system 1 comprising a bus in which a method to transmit data according to an embodiment of the invention may be employed.

As shown in FIG. 1, the system 1 comprises a plurality of modules/components/elements 1a, 1b, 1c, 1d which are connected in a chain-like structure over various busses 2a, 2b, 2c, 2d.

The components 1a, 1b, 1c, 1d may, e.g., be or comprise semi-conductor components such as integrated circuits 1a, 1b, 1c, 1d, for instance, respective ASICS (ASIC=application specific integrated circuit), Microprocessors, Microcontrollers, etc., or any other kind of integrated circuit or component comprising an integrated circuit. In particular, the components may be or comprise respective BALI ASICS (BALI=Battery Management for Lithium Ion Cells) 1a, 1b, 1c, 1d, etc.

Alternatively, the system 1 may be, e.g., a single integrated circuit chip, comprising various sub-components 1a, 1b, 1c, 1d, provided in one and the same single integrated circuit chip 1, the various sub-components/elements 1a, 1b, 1c, 1d of the single integrated circuit chip 1 being connected in a chain-like structure over various chip-internal busses 2a, 2b, 2c, 2d.

Preferably, the system 1 comprises a relatively high number of modules/components/elements 1a, 1b, 1c, 1d, e.g., more than two, in particular, more than five or ten or twenty modules/components/elements 1a, 1b, 1c, 1d, e.g., more than five or ten or twenty separate integrated circuits (or sub-components of a single integrated circuit), connected in the above chain-like structure over the above busses 2a, 2b, 2c, 2d.

Each of the busses 2a, 2b, 2c, 2d, e.g., may comprise as shown in FIG. 1—two respective transmission lines 12a, 12b, over which data may, e.g., be transmitted in differential form. Alternatively, each bus may e.g. only comprise one single transmission line, or more than two, e.g., three or more than three transmission lines.

For example, the busses 2a, 2b, 2c, 2d may be respective IBCB busses (IBCB=Inter Block Communication Bus), or any other kind of busses (e.g., respective CAN busses (CAN=Controller Area Network), LIN busses (LIN=Local Interconnect Network), or similar busses, etc.).

The above system 1, e.g., may be used in a vehicle, e.g., a car, a plane, a helicopter, a motorcycle, etc., in particular, in a car comprising an electric engine (and/or a combustion engine).

For instance, the system 1 may be used to control a battery, e.g., a battery provided in an electric vehicle, or any other battery provided, e.g., in any of the above-mentioned vehicles.

In the battery, several cells, e.g., respective Lithium Ion Cells, or any other kind of cells may be connected in series. The series connection of the cells may result in the battery providing a total voltage of more than ten, preferably more than hundred, two-hundred or five-hundred volts.

Each of the above modules/components/elements 1a, 1b, 1c, 1d of the system 1, e.g., each of the above integrated circuits/ASICS 1a, 1b, 1c, 1d may be used to monitor and/or control different ones of the above cells, and/or different blocks of cells/battery modules, each block of cells/battery module comprising several, different ones of the cells.

For instance, a first integrated circuit/ASIC 1a of the above integrated circuits 1a, 1b, 1c, 1d may be used to monitor and/or control a first cell, and/or a first battery module, a second integrated circuit/ASIC 1b of the above integrated circuits 1a, 1b, 1c, 1d may be used to monitor and/or control a second cell, and/or a second battery module, a third integrated circuit/ASIC 1c of the above integrated circuits 1a, 1b, 1c, 1d may be used to monitor and/or control a third cell, and/or a third battery module, a fourth integrated circuit/ASIC 1d of the above integrated circuits 1a, 1b, 1c, 1d may be used to monitor and/or control a fourth cell, and/or a fourth battery module, etc.

Thereby, e.g., the electric charge loaded in the respective cells/block of cells associated with a respective integrated circuit 1a, 1b, 1c, 1d may be detected by a respective integrated circuit 1a, 1b, 1c, 1d. Alternatively or in addition thereto, with the help of a respective integrated circuit 1a, 1b, 1c, 1d, an appropriate reaction to a detected electric charge loaded in respective cells/blocks of cells may be controlled. For instance, by use of a respective integrated circuit 1a, 1b, 1c, 1d, a single associated cell, and/or an associated block of cells may be discharged (passive balancing). Further, by use of a respective integrated circuit 1a, 1b, 1c, 1d, charge may be transferred between single cells, and/or respective blocks of cells (active balancing).

The above busses 2a, 2b, 2c, 2d, e.g., may be used to transmit data referring to the detected electric charge loaded in respective cells/block of cells associated with a respective one of the integrated circuits 1a, 1b, 1c, 1d—or any other kind of data from the respective integrated circuit 1a, 1b, 1c, 1d to a central microprocessor or microcontroller (not shown), e.g., a respective Battery Management Supervisor Controller, and/or to other ones of the above integrated circuits 1a, 1b, 1c, 1d, and/or vice versa (e.g., from the central microprocessor or microcontroller/Battery Management Supervisor Controller to the above integrated circuits 1a, 1b, 1c, 1d). The above central microprocessor or microcontroller/Battery Management Supervisor Controller, e.g., may be connected with the first (or last) integrated circuit in the above chain of integrated circuits 1a, 1b, 1c, 1d, e.g., via SPI (SPI=Serial Peripheral Interface). The above central microprocessor or microcontroller/Battery Management Supervisor Controller, in turn, may be connected to the main control device of the vehicle, e.g., via a respective CAN bus (CAN=Controller Area Network), or any other kind of data connection.

Each of the above modules/components/elements 1a, 1b, 1c, 1d of the system 1, e.g., each of the above integrated circuits/ASICS 1a, 1b, 1c, 1d may comprise a first interface, e.g., a Lowside Interface (LS Interface) 11a, a second interface, e.g., a Highside Interface (HS Interface) 11b, and optionally, a Level shifter connected between the LS Interface 11a, and the HS Interface 11b. Each level shifter may be connected with the respective additional logic circuits of a respective integrated circuit/ASIC 1a, 1b, 1c, 1d.

Hence, e.g., a logical "1" (or correspondingly, a logical "0") may, e.g., be transmitted from the integrated circuit/ASIC 1a (in particular, the respective Highside Interface (HS Interface) 11b thereof) via the bus 2a to the integrated circuit/ASIC 1b (in particular, the respective Lowside Interface (LS Interface) thereof). By the level shifter of the integrated circuit/ASIC 1b the received logical "1" (or the received logical "0") is shifted from the voltage domain of the ASIC 1a to the voltage domain of the ASIC 1b. Then, the voltage shifted received logical "1" (or logical "0") may, e.g., be transmitted from the integrated circuit/ASIC 1b (in particular, the respective Highside Interface (HS Interface) thereof) via the bus 2b to the integrated circuit/ASIC 1c (in particular, the respective Lowside Interface (LS Interface) thereof).

Thereafter, by the level shifter of the integrated circuit/ASIC 1c the received logical "1" (or the received logical "0") is shifted from the voltage domain of the ASIC 1b to the voltage domain of the ASIC 1c. Then, the voltage shifted received logical "1" (or logical "0") may, e.g., be transmitted from the integrated circuit/ASIC 1c (in particular, the respective Highside Interface (HS Interface) thereof) via the bus 2c to the integrated circuit/ASIC 1d (in particular, the respective Lowside Interface (LS Interface) thereof). By the level shifter of the integrated circuit/ASIC 1d the received logical "1" (or the received logical "0") is shifted from the voltage domain of the ASIC 1c to the voltage domain of the ASIC 1d, and is then transmitted from the integrated circuit/ASIC 1d (in particular, the respective Highside Interface (HS Interface) thereof) via the bus 2d to the next ASIC in the chain, etc.

Each integrated circuit/ASIC 1a, 1b, 1c, 1d, in particular, each of the above level shifters may, e.g., shift the level of the data signals (e.g., the above logical "1"s (or logical "0"s)) by a relatively high voltage amount, e.g., between 1V and 200 V, in particular, between 5V and 100 V, or 10V and 80V, e.g., up to 60V.

The busses 2a, 2b, 2c, 2d hence may be seen as commonly forming a bus system, where the separate buses 2a, 2b, 2c, 2d are galvanically decoupled from one another.

In addition, in some embodiments, the galvanic connection between respective HS and LS Interfaces of two different ones of the above integrated circuits/ASICs provided by a respective one of the above busses 2a, 2b, 2c, 2d (e.g., the galvanic connection between the HS Interface 11b of the integrated circuit/ASIC 1a and the LS Interface 11a of the integrated circuit/ASIC 1b provided by the bus 2a, etc.) may be interrupted by a respective series connection of capacitors.

The delay caused by the above integrated circuits/ASICs 1a, 1b, 1c, 1d in the above chain when transferring the above signals may differ depending on whether, e.g., a logical "1", or a logical "0" is transmitted, and/or whether there is, e.g., a positive, or a negative level shift, etc. Such delay differences, e.g., may vary depending from the temperature, the supply voltage, inherent differences between individual components, i.e., are stochastic delay differences. For instance, the delay caused by an individual integrated circuit/ASIC 1a, 1b, 1c, 1d in the above chain may, e.g., be in the range of +/−25 ns, i.e., the maximum stochastic delay difference may, e.g., be around 50 ns.

Figure 2:
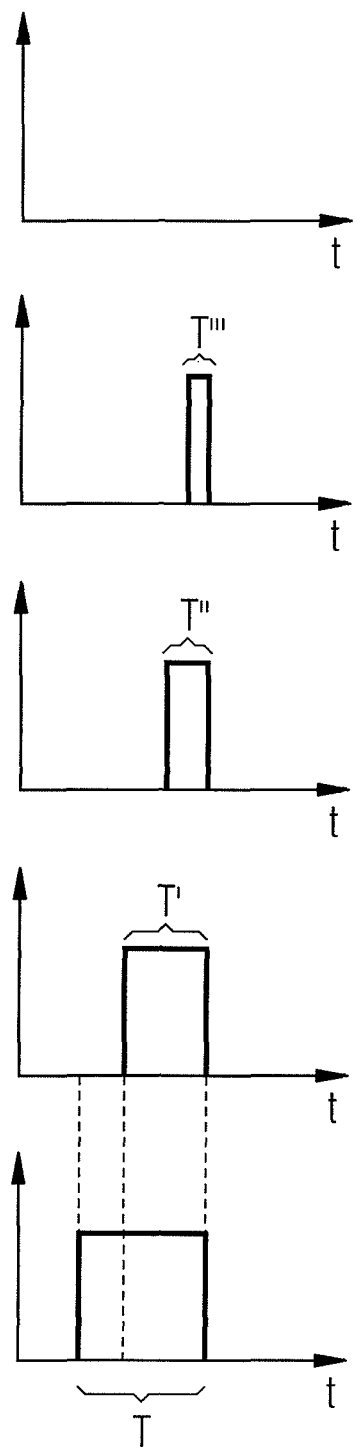
FIG. 2 schematically depicts symbol length differences which may occur in conventional systems with various integrated circuits connected in a chain-like structure.

In conventional systems, as is, e.g., shown in FIG. 2, when transmitting data through the above chain, such delay differences may sum up such that the maximum total possible delay difference gets close to the length of an individual symbol (e.g., the length of a transmitted logical "1", and/or the length of a transmitted logical "0").

For instance, in a conventional system, as is shown in FIG. 2, a logical "1" (or correspondingly, a logical "0") received by a first integrated circuit at its LS interface may, e.g., comprise a symbol length T. Then, the received logical "1" may, e.g., be transmitted from the HS interface of the first integrated circuit to the LS interface of a second integrated circuit. However, due to e.g. the above delay differences, as is shown in FIG. 2, the logical "1" transmitted by the first integrated circuit may comprise a symbol length T', different from the original symbol length T. Thereafter, the logical "1" received at the LS interface of the second integrated circuit may, e.g., be transmitted from the HS interface of the second integrated circuit to the LS interface of a third integrated circuit. However, due to, e.g., the above delay differences, as is shown in FIG. 2, the logical "1" transmitted by the second integrated circuit may comprise a symbol length T'', different from the above symbol length T', and even more different from the original symbol length T. Then, the logical "1" received at the LS interface of the third integrated circuit may, e.g., be transmitted from the HS interface of the third integrated circuit to the LS interface of a fourth integrated circuit. However, due to, e.g., the above delay differences, as is shown in FIG. 2, the logical "1" transmitted by the third integrated circuit may comprise a symbol length T''', different from the above symbol length T'', more different from the above symbol length T', and even more different from the original symbol length T, etc.

To overcome this or other deficiencies of conventional systems, according to an embodiment of the invention, and as is shown, e.g., in FIGS. 4, 5a and 5b, and as will be described in further detail below, a specific deliberate delay d is employed by the initial sender of data in the above chain of modules/components/elements/1a, 1b, 1c, 1d of the system 1 shown in FIG. 1.

In particular, the initial sender of data (e.g., one of the above integrated circuits 1a, 1b, 1c, 1d, the above central microprocessor or microcontroller, etc.) in the above chain deliberately delays the (initial) transmission of a logical "1" (delay d). However, in turn, and as is shown in FIGS. 4, 5a and 5b, the (initial) transmission of a logical "0" is not delayed. The delay d, e.g., may be caused by a respective delay element 11 provided in a respective (initially sending) module/component/element/integrated circuit 1a, 1b, 1c, 1d, or in any other suitable way.

Figure 4:
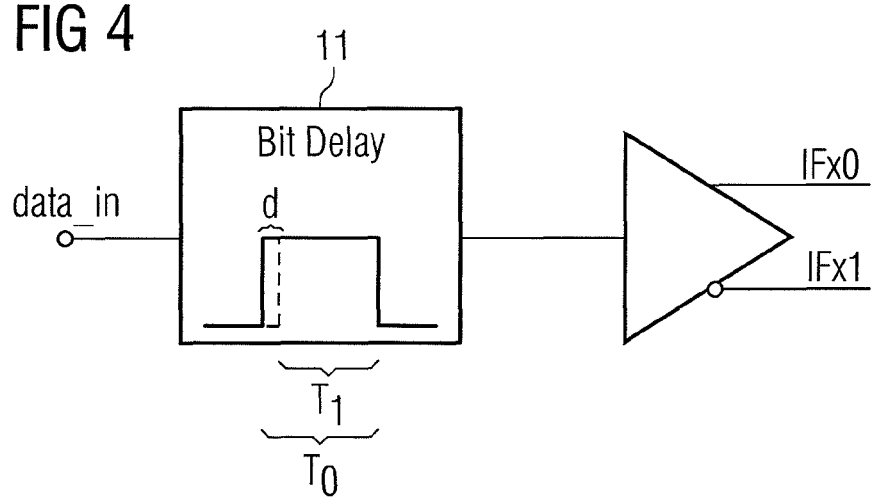
FIG. 4 schematically depicts a deliberate delay of a logical "1", in particular, of a rising edge thereof according to an embodiment of the invention.
Figure 5A:
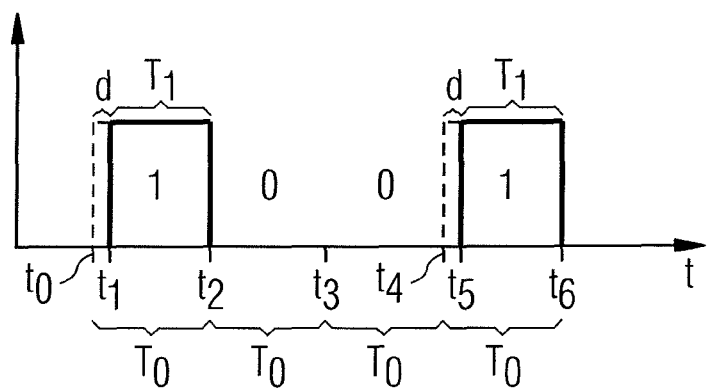
FIG. 5a schematically depicts an example of a series of data transmitted according to an embodiment of the invention, where the transmission of a logical "1", in particular, of a rising edge thereof is deliberately delayed.
Figure 5B:
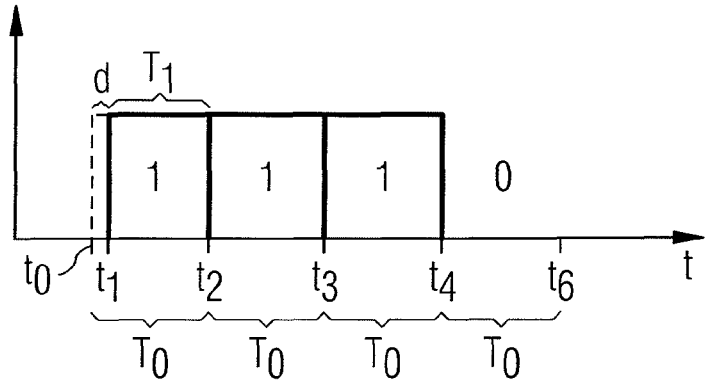
FIG. 5b schematically depicts another example of a series of data transmitted according to an embodiment of the invention, where the transmission of a logical "1" is deliberately delayed.

As is shown in FIGS. 4, 5a and 5b, the initial sender of data (e.g., one of the above integrated circuits 1a, 1b, 1c, 1d) e.g., may only deliberately delay the rising edge of a respective (initially transmitted) logical "1", but may not delay the falling edge of a respective (initially transmitted) logical "1". Hence, when initially transmitting a logical "1", the respective integrated circuit 1a, 1b, 1c, 1d, e.g., changes the level of the respective transmission line/lines 12a, 12b of the respective bus 2a, 2b, 2c, 2d not at a point of time t0, but, instead, only the above predetermined delay d after the point of time t0, i.e., at the point of time t1 (see FIGS. 5a, 5b). When after a logical "1" a logical "0" is transmitted, the level of the respective transmission line/lines 12a, 12b of the respective bus 2a, 2b, 2c, 2d is changed back without delay, i.e., as is shown in FIG. 5a, at a point of time t2. Hence, due to the delayed rising edge, the symbol length of the above logical "1" is shorter than a standard symbol length T0, namely, is T1, only (see FIGS. 4, 5a, 5b).

According to other, different embodiments (not shown), the initial sender of data in the above chain of modules/components/elements/integrated circuits 1a, 1b, 1c, 1d, etc., may employ an opposite principle, i.e., e.g., may deliberately delay the transmission of a logical "0" (delay d), but, in turn, may not delay the transmission of a logical "1". Thereby, for instance, the initial sender of data (e.g., one of the above integrated circuits 1a, 1b, 1c, 1d) e.g., may only deliberately delay the falling edge of a respective logical "0", but may not delay the rising edge of a respective logical "0". Hence, due to the delayed falling edge, the symbol length of such a logical "0" then is shorter than a standard symbol length T0, e.g., is T1, only.

Getting back to the example shown in FIGS. 4, 5a, 5b, where as said the (initial) transmission of a logical "1" is delayed, but the (initial) transmission of a logical "0" is not delayed. If a logical "0" is transmitted after a logical "1" has been transmitted, and then another (second) logical "0", as is shown in FIG. 5a, the symbol length of the first one of these logical "0"s corresponds to the standard symbol length T0 (as the first one of these logical "0"s, which is transmitted after the above logical "1," e.g., lasts from the above point of time t2 to a point of time t3). If after the second one of these logical "0"s again a logical "1" is transmitted, as is shown in FIG. 5a, the respective integrated circuit 1a, 1b, 1c, 1d, e.g., changes the level of the respective transmission line/lines 12a, 12b of the respective bus 2a, 2b, 2c, 2d not at a point of time t4, but, instead, only the above predetermined delay d after the point of time t4, i.e., at the point of time t5 (see FIG. 5a). Due to this, as can be seen in FIG. 5a, the symbol length of the second one of the above logical "0"s can be seen to not correspond to the standard symbol length T0, either, but can be seen to be longer than a standard symbol length T0, namely, T0+d (as the second one of the above logical "0"s shown in FIG. 5a, e.g., lasts from the above point of time t3 to the above point of time t5).

As is shown in FIG. 5b, if after a (first) logical "1", which as was mentioned above, e.g., lasts from the above point of time t1 to the above point of time t2 (i.e., has a symbol length T1 shorter than a standard symbol length T0) another (second) logical "1" is transmitted, and then a further (third) logical "1", the symbol length of the second one of these logical "1"s as shown in FIG. 5b other than the symbol length of the first logical "1" again corresponds to the standard symbol length T0 (as the second one of these logical "1"s, which is transmitted after the above first logical "1," e.g., lasts from the above point of time t2 to a point of time t3). If after the second and third one of these logical "1"s a logical "0" is transmitted, as is shown in FIG. 5b, the respective integrated circuit 1a, 1b, 1c, 1d, e.g., changes the level of the respective transmission line/lines 12a, 12b of the respective bus 2a, 2b, 2c, 2d without delay, i.e., at the point of time t4 (see FIG. 5b). Due to this, as can be seen in FIG. 5b, the symbol length of the third one of the above logical "1"s just as the symbol length of the second one of the above logical "1"s can also be seen to correspond to the standard symbol length T0 (as the third one of the above logical "1"s e.g. lasts from the above point of time t3 to the above point of time t4).

In other words, according to the embodiment shown in FIGS. 4, 5a, 5b, in a series of consecutively transmitted logical "1"s, only the first one of these logical "1"s is deliberately delayed by the above delay d (in particular, the rising edge thereof, such that this first logical "1" has a symbol length T1 shorter than a standard symbol length T0). The logical "1"s transmitted immediately after the first logical "1" are not delayed, i.e., comprise a standard symbol length T0. Only if a logical "1" is transmitted immediately after a logical "0", such logical "1" (in particular, the rising edge thereof) is delayed by the above deliberate delay d (see FIGS. 4, 5a, 5b).

According to an embodiment, the above deliberate delay d may, e.g., be chosen to be in the range of (or, e.g., somewhat smaller or even bigger) than the above maximum stochastic delay difference, e.g., the maximum difference between different possible delays which may be caused by the above modules/components/elements/integrated circuits 1a, 1b, 1c, 1d when transferring signals through the above chain.

For instance, as mentioned above, the delay caused by an individual integrated circuit/ASIC 1a, 1b, 1c, 1d in the above chain may, e.g., be in the range of +/−25 ns, i.e., the maximum stochastic delay difference may, e.g., be around 50 ns. According to an embodiment, the above deliberate, systematic delay d may, e.g., be chosen to be between half and double (or even triple) the maximum delay difference, e.g., between 25 ns and 100 ns (or 150 ns), preferably, e.g., between 40 ns 60 ns, for instance, approximately 50 ns. Hence, it is guaranteed that the deliberate delay predominates the stochastic delay.

The above symbol lengths, e.g., the standard symbol length T0 may e.g. depend from the respective data rate. For instance, if the data rate is 1 Mbit/s, the standard symbol length T0 e.g. may be 1 microsecond. For example, the standard symbol length T0 may be between 0.01 and 100 microseconds, e.g., between 0.1 and 10 microseconds, etc.

As mentioned above, according to embodiments of the invention, the initial sender of data (e.g., one of the above integrated circuits 1a, 1b, 1c, 1d, the above central microprocessor or microcontroller, etc.) in the above chain of modules/components/elements/integrated circuits 1a, 1b, 1c, 1d may deliberately delay the (initial) transmission of a logical "1", in particular, may deliberately delay the rising edge thereof by the above delay d (or, conversely, as mentioned above, may deliberately delay the (initial) transmission of a logical "0" (e.g., a falling edge thereof)), and may not delay transmission of other logical "0" or "1"s, as described above in connection with FIGS. 4, 5a and 5b.

As is shown in FIG. 1, the above delayed or not delayed logical "1"s and "0"s (as e.g., shown in FIGS. 5a and 5b) e.g., may be transmitted from the respective initially sending module/component/element/integrated circuit 1a, 1b, 1c, 1d, e.g., the integrated circuit 1a (in particular, the respective Highside Interface (HS Interface) 11b thereof) via a respective bus, e.g., the bus 2a to the next module/component/element/integrated circuit in the chain, e.g., the integrated circuit 1b (in particular, the respective Lowside Interface (LS Interface) thereof).

According to an embodiment of the invention, the respectively (delayed or not delayed) logical "1"s and "0"s received by the integrated circuit 1b are not simply level shifted and then transmitted from the receiving integrated circuit 1b (in particular, the respective Highside Interface (HS Interface) thereof) via the bus 2b to the next integrated circuit 1c in the chain. Instead, e.g., a ISO-OSI layer 1 correction mechanism, or other suitable correction mechanisms may be applied in the receiving module/component/element/integrated circuit 1b.

For instance, if in the receiving module/component/element/integrated circuit 1b, e.g., the respective Lowside Interface (LS Interface) thereof it is securely detected that a logical "1" was received, and if this logical "1" is received after a logical "0", it is known that this logical "1" is a delayed logical "1", which comprises a known symbol length T1 which is shorter than a standard symbol length T0 (see FIGS. 5a and 5b). In this case, immediately after securely detecting receipt of the respective logical "1", a voltage shifted logical "1" is transmitted from the receiving module/component/element/integrated circuit 1b (in particular, the respective Highside Interface (HS Interface) thereof) via a respective bus, e.g., the bus 2b to the next module/component/element/integrated circuit in the chain, e.g., the integrated circuit 1c (in particular, the respective Lowside Interface (LS Interface) thereof), which is forced to comprise the above known symbol length T1, regardless how long in fact a logical "1" is received at the Lowside Interface (LS Interface) of the integrated circuit 1b.

If, however, in the receiving module/component/element/integrated circuit 1b, e.g., the respective Lowside Interface (LS Interface) thereof it is detected that a logical "1" was received, and if this logical "1" is received after an (immediately preceding) further logical "1", it is known that this (second) logical "1" is a non-delayed logical "1", which comprises the known standard symbol length T0 (see FIG. 5b). In this case, immediately after securely detecting receipt of the respective (non-delayed (second)) logical "1", a voltage shifted (second) logical "1" is transmitted from the receiving module/component/element/integrated circuit 1b (in particular, the respective Highside Interface (HS Interface) thereof) via the bus 2b to the next module/component/element/integrated circuit in the chain, e.g., the integrated circuit 1c (in particular, the respective Lowside Interface (LS Interface) thereof), which is forced to comprise the above known standard symbol length T0, again regardless how long in fact a logical "1" is received at the Lowside Interface (LS Interface) of the integrated circuit 1b.

To achieve that the detected logical "1"s are transmitted with the respectively known symbol lengths (T0, or T1, depending on whether or not a delayed or non-delayed logical "1" is known to have been received), an oscillator 4 (see FIG. 1) may be used in the receiving module/component/element/integrated circuit 1b, or any other suitable means, e.g., a respective internal or external clock signal, etc.

If in the receiving module/component/element/integrated circuit 1b, e.g., the respective Lowside Interface (LS Interface) thereof it is securely detected that a logical "0" was received, it is assumed that this logical "0" comprises the known standard symbol length T0 (or the above symbol length T0+d, if such a logical "0" is followed by a logical "1" (see FIG. 5a)). Hence, immediately after securely detecting receipt of the respective logical "0", a voltage shifted logical "0" is transmitted from the receiving module/component/ element/integrated circuit 1b (in particular, the respective Highside Interface (HS Interface) thereof) via the bus 2b to the next module/component/element/integrated circuit in the chain, e.g., the integrated circuit 1c (in particular, the respective Lowside Interface (LS Interface) thereof), which is forced to comprise the above known standard symbol length T0 (or T0+d, see explanation above), again regardless of how long in fact a logical "0" is received at the Lowside Interface (LS Interface) of the integrated circuit 1b.

By the voltage shifting of the respective logical "1"s or "0"s, the received logical "1"s or "0"s are shifted from the voltage domain of the previously sending module/component/element/integrated circuit 1a to the voltage domain of the next, i.e., the respectively receiving module/component/element/integrated circuit 1b in the chain. This may be achieved by the above level shifters, or any other suitable means.

Figure 3:
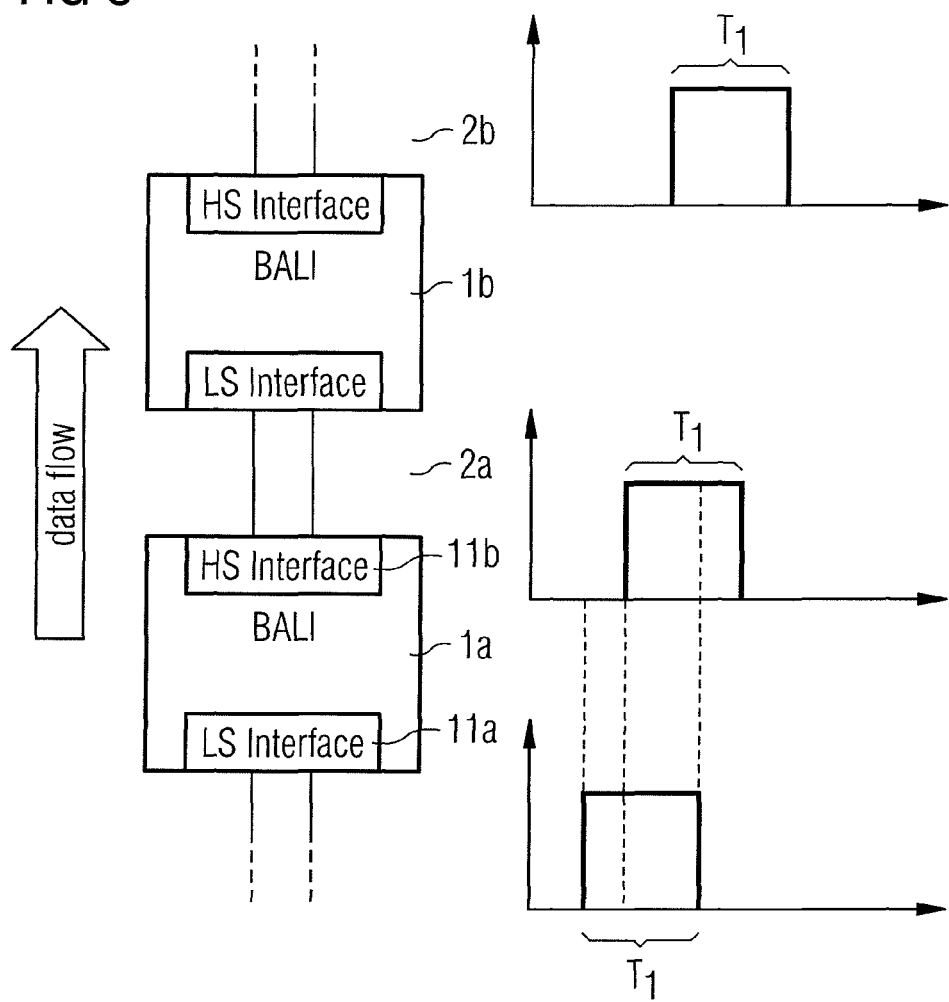
FIG. 3 schematically depicts symbol lengths which may occur in a system with various integrated circuits connected in a chain-like structure according to an embodiment of the invention.

As explained above, according to embodiments of the invention, the deliberate delay d used for the transmission of a logical "1" (or, alternatively, a logical "0") predominates the stochastic delay caused by the respective modules/components/elements/integrated circuits in the chain. Hence, an exact or almost exact correction of delay differences may be achieved by the above and/or other correction mechanisms. Therefore, other than with conventional systems, and other than shown in and explained with respect to FIG. 2, it may be avoided that delay differences sum up when a logical "1" or a logical "0" is transmitted from integrated circuit to integrated circuit through the above chain of integrated circuits. Therefore, other than shown in FIG. 2, and as shown in FIG. 3, according to embodiments of the invention, e.g. a symbol length T1 (or, e.g., T0) of, e.g., a logical "1" received by the integrated circuit 1a substantially corresponds to the symbol length T1 (or, e.g., T0) of a logical "1" which in response is transmitted by the integrated circuit 1a, which substantially corresponds to the symbol length T1 (or, e.g., T0) of a logical "1" which in response is transmitted by the integrated circuit 1b, which substantially corresponds to the symbol length T1 (or, e.g., T0) of a logical "1" which in response is transmitted by the integrated circuit 1c, which substantially corresponds to the symbol length T1 (or, e.g., T0) of a logical "1" which in response is transmitted by the integrated circuit 1d, etc. Hence, the symbol lengths substantially remain constant whilst data is transmitted from circuit to circuit through the above chain of integrated circuits 1a, 1b, 1c, 1d.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention is only limited by the claims and the equivalents thereof.

What is claimed is:

1. A method to transmit data over a bus system, the method comprising:
   receiving a request to transmit data; and
   transmitting the data in response to the request, wherein the data is transmitted after a first delay time if the data is a first logic value and the data is transmitted after a second delay time if the data is a second logic value, the second delay time shorter than the first delay time.

2. The method of claim 1, wherein the second delay time is zero so that the data is transmitted without any delay if the data is the second logic value.

3. The method of claim 2, wherein the first logic value is a logical "1" and wherein the second logic value is a logical "0".

4. The method of claim 2, wherein the first logic value is a logical "0" and wherein the second logic value is a logical "1".

5. The method of claim 1, wherein the first delay time is chosen to predominate stochastic delay differences.

6. The method of claim 5, wherein the second delay time is chosen to predominate stochastic delay differences.

7. The method of claim 1, wherein the first logic value is a logical "1" and wherein the second logic value is a logical "0".

8. The method of claim 7, wherein the data has a logical "1" and the transmitting comprises deliberately delaying a rising edge of the transmitted logical "1", but not deliberately delaying a falling edge of the transmitted logical "1".

9. The method of claim 7, wherein the data has a logical "1" and the transmitting comprises deliberately delaying a falling edge of the transmitted logical "1", but not deliberately delaying a rising edge of the transmitted logical "1".

10. The method of claim 1 wherein the first logic value is a logical "0" and wherein the second logic value is a logical "1".

11. The method of claim 10, wherein the data has a logical "0" and the transmitting comprises deliberately delaying a rising edge of the transmitted logical "0", but not deliberately delaying a falling edge of the transmitted logical "0".

12. The method of claim 10, wherein the data has a logical "0" and the transmitting comprises deliberately delaying a falling edge of the transmitted logical "0", but not deliberately delaying a rising edge of the transmitted logical "0".

13. The method of claim 1, wherein the bus system connects a plurality of modules/components/elements in a chain-like structure, the method comprising:
   transmitting the data from one module/component/element to another module/component/element through the chain-like structure.

14. The method of claim 1, wherein the data is transmitted over an Inter Block Communication Bus (IBCB).

15. A system comprising:
   a bus;
   a first device coupled to the bus, the first device comprising receiving circuitry configured to receive data from the bus; and
   a second device coupled to the bus, the second device configured to transmit on the bus, wherein the data is transmitted after a first delay time if the data is a first logic value and the data is transmitted after a second delay time if the data is a second logic value, the second delay time shorter than the first delay time.

16. The system of claim 15, wherein the first delay time is chosen to predominate stochastic delay differences.

17. The system of claim 15, further comprising a third device coupled to the bus, wherein the bus is configured in a chain-like structure.

18. The system of claim 17, wherein the first, second and third devices comprise devices selected from the group consisting of modules, components and elements.

19. The system of claim 17, wherein each of the first, second and third devices comprises an integrated circuit.

20. The system of claim 15, wherein the bus comprises an Inter Block Communication Bus (IBCB).

21. The system of claim 15, wherein the first logic value is a logical "1".

22. The system of claim 15, wherein the first logic value is a logical "0".

23. The system of claim 15, wherein the first or second delay time is applied only on a rising edge.

24. The system of claim 15, wherein the first or second delay time is applied only on a falling edge.

25. A device configured to deliberately delay transmission of data based on a logic value of the data such that transmission of data symbols having different logic values are delayed by different time periods, wherein the deliberate delay predominates stochastic delay differences occurring during transfer of the data from the device to another device.

26. The device of claim 25, wherein the device is configured to deliberately delay transmission of the data over an Inter Block Communication Bus (IBCB).

27. The device of claim 25, wherein the device is configured to deliberately delay transmission of the data based on the logic value of the data by:
deliberately delaying a first edge of the data without deliberately delaying a second edge of the data when the data comprises a first logic value, where the first edge comprises either a rising edge or a falling edge, wherein the second edge comprises the falling edge when the first edge comprises the rising edge, and wherein the second edge comprises the rising edge when the first edge comprises the falling edge.

28. An apparatus comprising:
a plurality of modules/components/elements connected in a chain-like structure; and
a device configured to deliberately delay transmission of data through the chain-like structure based on a logic value of the data, wherein data symbols having different logic values are delayed by different time periods.

29. The apparatus of claim 28, further comprising:
a battery comprising a plurality of cells/blocks of cells, the plurality of modules/components/elements configured to monitor the plurality of cells/blocks of cells.

30. The apparatus of claim 28, wherein the chain-like structure comprises an Inter Block Communication Bus (IBCB).

31. The apparatus of claim 28, wherein the device is configured to deliberately delay transmission of the data based on the logic value of the data by:
deliberately delaying a first edge of the data without deliberately delaying a second edge of the data when the data comprises a first logic value, where the first edge comprises either a rising edge or a falling edge, wherein the second edge comprises the falling edge when the first edge comprises the rising edge, and wherein the second edge comprises the rising edge when the first edge comprises the falling edge.

* * * * *